US011615108B2

(12) United States Patent
Vasireddy et al.

(10) Patent No.: US 11,615,108 B2
(45) Date of Patent: Mar. 28, 2023

(54) SYSTEM AND METHOD FOR RUNNING WAREHOUSE LOADS FOR MULTIPLE TENANTS OF A DATA WAREHOUSE

(71) Applicant: ORACLE INTERNATIONAL CORPORATION, Redwood Shores, CA (US)

(72) Inventors: Gunaranjan Vasireddy, Hyderabad (IN); Phani Krishna Somayajula, Hyderabad (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 16/852,070

(22) Filed: Apr. 17, 2020

(65) Prior Publication Data

US 2020/0334270 A1     Oct. 22, 2020

(30) Foreign Application Priority Data

Apr. 18, 2019   (IN) .............................. 201941015562

(51) Int. Cl.
*G06F 16/25* (2019.01)
*G06F 16/28* (2019.01)
*G06F 9/50* (2006.01)
*G06F 16/182* (2019.01)
*G06F 16/21* (2019.01)

(52) U.S. Cl.
CPC .......... *G06F 16/254* (2019.01); *G06F 9/5083* (2013.01); *G06F 16/182* (2019.01); *G06F 16/214* (2019.01); *G06F 16/283* (2019.01)

(58) Field of Classification Search
CPC .... G06F 16/254; G06F 16/182; G06F 16/214; G06F 16/283
See application file for complete search history.

(56) References Cited

U.S. PATENT DOCUMENTS

| | | | |
|---|---|---|---|
| 9,442,993 B2 | 9/2016 | Tung | |
| 9,619,535 B1* | 4/2017 | Kapoor | ................. G06F 16/254 |
| 9,922,104 B1* | 3/2018 | Kapoor | ................. G06F 16/254 |
| 9,961,011 B2 | 5/2018 | Mordani | |
| 10,078,676 B2 | 9/2018 | Bhagat | |
| 10,685,033 B1* | 6/2020 | Searls | .................... G06F 16/54 |
| 2008/0162509 A1 | 7/2008 | Becker | |
| 2013/0191306 A1* | 7/2013 | Wilkinson | ............. G06Q 10/10 |
| | | | 705/348 |

(Continued)

OTHER PUBLICATIONS

United States Patent and Trademark Office, Notice of Allowance and Fee(s) Due dated Sep. 2, 2022 for U.S Appl. No. 16/862,394, 9 pages.

(Continued)

*Primary Examiner* — Amresh Singh
*Assistant Examiner* — Courtney Harmon
(74) *Attorney, Agent, or Firm* — Tucker Ellis LLP

(57) ABSTRACT

Systems and methods for automatic error rejection are provided. Systems and methods described herein bypass the creation of a staging table at the outset and, instead, attempt a direct merge from a source data location to a target data location. In the event that the merge fails, then a temporary/staging table can be loaded where errors can be logged, validations can be performed, and erroneous data can be corrected.

20 Claims, 14 Drawing Sheets

(56) References Cited

U.S. PATENT DOCUMENTS

| | | | |
|---|---|---|---|
| 2014/0229511 A1 | 8/2014 | Fung | |
| 2015/0207758 A1 | 7/2015 | Mordani | |
| 2016/0292192 A1 | 10/2016 | Bhagat | |
| 2016/0328566 A1 | 11/2016 | Nellamakkada | |
| 2019/0294596 A1* | 9/2019 | Yan | G06F 11/301 |
| 2020/0349155 A1 | 11/2020 | Reinshagen | |

OTHER PUBLICATIONS

United States Patent and Trademark Office, Office Communication dated May 11, 2022 for U.S. Appl. No. 16/862,394, 19 pages.
United States Patent and Trademark Office, Office Communication dated Aug. 19, 2021 for U.S. Appl. No. 16/862,394, 15 pages.
Oracle, "Fusion Middleware Developing Integration Projects with Oracle Data Integrator 12c (12.2.1.1)", May 2016, 340 pages.
Oracle, "Fusion Middleware Developing Integration Projects with Oracle Data Integrator—Overview of Oracle Data Integrator Topology", 4 pages, retrieved on Oct. 20, 2022 from <https://docs.oracle.eom/middleware/12211/odi/develop/setup_topology.htm#ODIDG171>.

* cited by examiner

SYSTEM AND METHOD FOR RUNNING WAREHOUSE LOADS FOR MULTIPLE TENANTS OF A DATA WAREHOUSE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY AND CROSS REFERENCE TO RELATED APPLICATIONS

This application claims the benefit of priority to Indian Patent Application No. 201941015562 entitled "SYSTEM AND METHOD FOR RUNNING WAREHOUSE LOADS FOR MULTIPLE TENANTS OF A DATA WAREHOUSE", filed on Apr. 18, 2019, which application is herein incorporated by reference in its entirety.

TECHNICAL FIELD

Embodiments described herein are generally related to computer data analytics, and business intelligence, and are particularly related to systems and methods for providing an application analytics environment that enables the development of software analytic applications.

BACKGROUND

Computer data analytics and business intelligence form increasingly important aspects of the enterprise software applications industry.

Generally described, data analytics enable a machine-driven analysis of large amounts of transactional or stored data, in order to derive conclusions or other information from that data; while business intelligence (BI) software tools provide business users with access to the information in a format that enables those users to make strategic business decisions.

Increasingly, organizations are interested in developing software applications that leverage the use of data analytics within the context of the organization's enterprise software applications, for use in business intelligence. These are some examples of the types of technology areas within which embodiments of the invention can be used.

In traditional business intelligence systems, different customers or tenants (e.g., different companies, different departments within a same company, etc.) were generally allotted separate systems in which one (or more, dependent upon the requirements of the tenant) setup was provisioned for each customer/tenant. This setup included, for example, instances of a data integration system, as well as extract, transform, and load methods. As well, each customer was provided with a dedicated repository along with the other components.

However, one of the drawbacks of such configurations was the wasted resources associated with extract, transform, load (ETL) systems. While each customer was allocated a separate ETL system, once the customer had imported their data, and excepting scheduled data pulls, the ETL systems sat idle, representing an inefficient use of resources.

SUMMARY

Described herein are systems and methods for providing an analytic applications environment that enables the development of software analytic applications, including access by data integration pipelines to a data warehouse, and additional features and uses thereof.

In accordance with an embodiment, customers (tenants) of the analytic applications environment can develop analytic applications for use with a business intelligence component (e.g., an Oracle Business Intelligence Applications, OBIA, or other type of business intelligence component) that is designed to analyze large amounts of data sourced either by the tenant itself, or provided by multiple third-party entities, and provide the resultant information in a format that enables business users to make strategic business decisions.

In accordance with an embodiment, an analytic application can be associated with a data integration pipeline (e.g., an extract, transform, and load (ETL) process) that can be maintained or accessed by a data integration component (e.g., an Oracle Data Integrator, ODI, or other type of data integration component).

In accordance with an embodiment, a data warehouse component that stores large amounts of data (e.g., an Oracle Autonomous Data Warehouse, ADWC, or other type of data warehouse component) can be populated in accordance with a schema (e.g., a star schema) that is sourced from an enterprise software applications component (e.g., an Oracle Fusion Applications, or other type of enterprise software applications component).

The data made available to each tenant of the analytic applications environment can be provisioned in a data warehouse tenancy (e.g., an ADWC tenancy) that is associated with, and accessible only to, that tenant; while at the same time allowing access by all of the tenants to various, e.g., ETL-related or other features, of a shared infrastructure.

For example, in accordance with an embodiment, the analytic applications environment can include a data pipeline layer that enables a particular tenant to ingest data extracted from their organization's enterprise software applications component (e.g., Oracle Fusion Applications), to be loaded into their data warehouse tenancy (e.g., ADWC tenancy), including support for multiple data warehouse schemas, data extract and target schemas, and monitoring of pipeline stages; coupled with a shared pipeline infrastructure that provides transformation maps or repositories that are common to all tenants.

As another example, in accordance with an embodiment, the analytic applications environment can include a data transformation layer that enables, for the tenants of the analytic applications environment, advanced features such as, for example, data anomaly detection, data validation, or other quality control characteristics of the data being extracted from a particular organization's enterprise software applications component (e.g., Oracle Fusion Applications); which can be supplemented with reports on data validation or quality failures that are provided to those tenants, to enable them to fix their data and reprocess.

In accordance with an embodiment, access to the analytic applications environment can be provided, e.g., as a Software-as-a-Service (SaaS) application or offering, that can be made accessible to customers of a cloud environment (e.g., an Oracle Cloud Infrastructure, OCI, or other cloud environment), or provided as a cloud service (e.g., an Oracle Analytics Cloud service, OAC, Oracle Fusion Analytics service, or other cloud service).

In accordance with an embodiment, the provisioning offered through cloud environments such as, for example, OCI, which enables support for features such as pipeline and data backup, restoration, and patching, can be integrated with other SaaS or Platform-as-a-Service (PaaS) components, including, for example, billing components that provide support for customer-specific limits on data processing, and hybrid (e.g., based on a combination of SaaS/PaaS) billing.

Described herein are systems and methods for multiple tenancy support of ETL (extract, transform, load) repository are provided, in accordance with an embodiment. Systems and methods can a provide a business intelligence system comprising a control plane, a data plane, and two or more data warehouses, wherein each data warehouse is associated with a tenant of a plurality of tenants. A first customer tenancy for a first tenant is provided that comprises a first database instance, a first staging area, and a first data warehouse of the two or more data warehouses. A second customer tenancy for a second tenant is provided that comprises a second database instance, a second staging area, and a second data warehouse of the two or more data warehouses. The first customer tenancy and the second customer tenancy can share an ETL server for use in ETL processes, the ETL server comprising one or more data integrator agents, the one or more data integrator agents being associated with a data integrator repository.

In accordance with an embodiment, an ETL server can be shared among a plurality of customer tenancies, wherein the ETL server can utilize agents and a data integrator repository to run ETL processes among the plurality of customer tenancies while retaining data segregation among the data from the different tenants. The systems and methods described herein can not only serve multiple tenants with ETL processes, but can still also maintain tenant customization of ETL processes, and can ensure resource availability.

DETAILED DESCRIPTION

Figure 1:
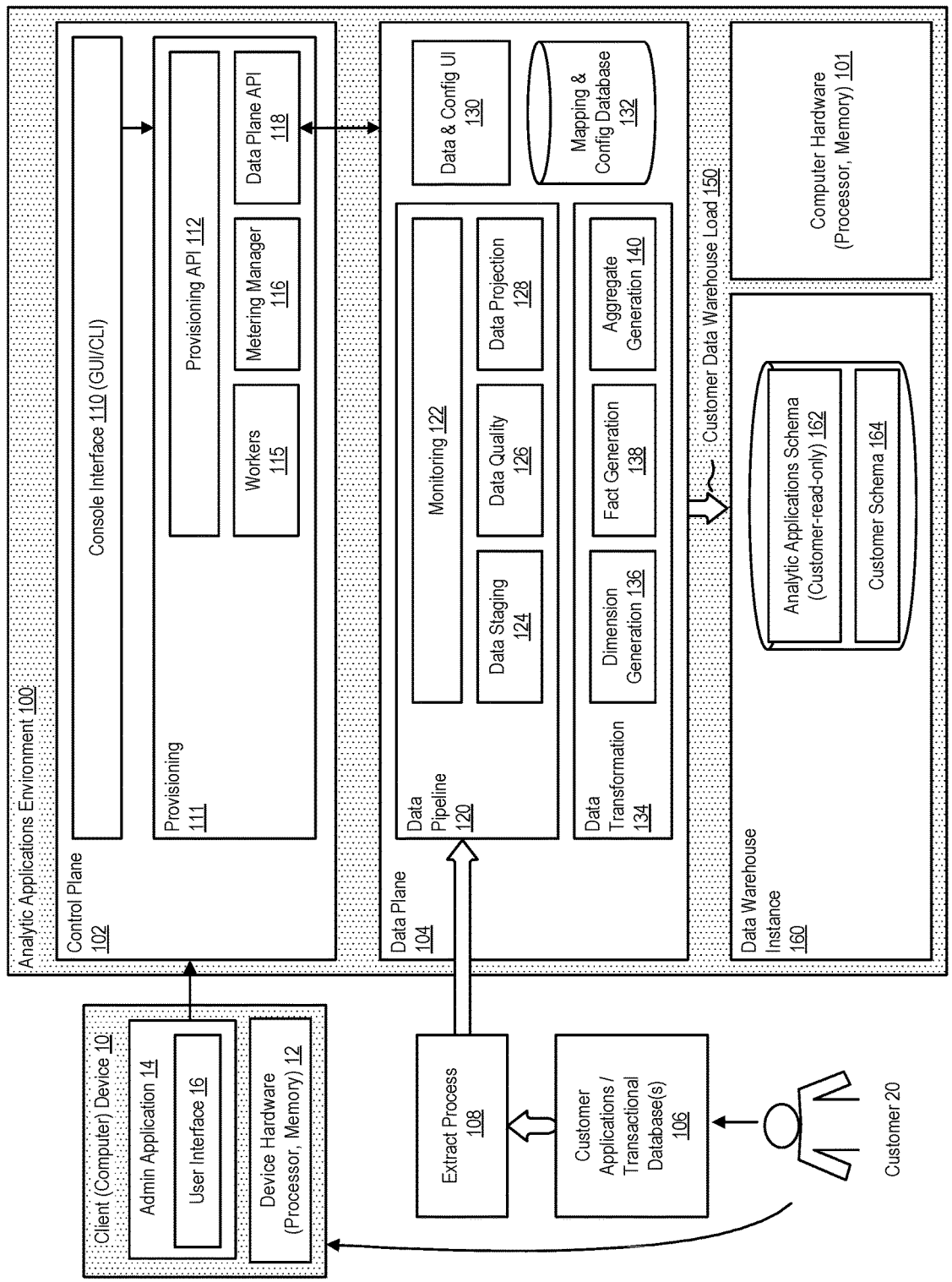
FIG. 1 illustrates a system for providing an analytic applications environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example an Oracle Fusion Applications environment or other type of enterprise software application or data environment; or within the context of a software-as-a-service (SaaS) or cloud environment, such as, for example an Oracle Analytics Cloud or Oracle Cloud Infrastructure environment, or other type of cloud environment.

In accordance with an embodiment, an analytic applications environment enables data analytics within the context of an organization's enterprise software application or data environment, or a software-as-a-service or other type of cloud environment; and supports the development of computer-executable software analytic applications.

A data pipeline or process, such as, for example an extract, transform, load process, can operate in accordance with an analytic applications schema adapted to address particular analytics use cases or best practices, to receive data from a customer's (tenant's) enterprise software application or data environment, for loading into a data warehouse instance.

Each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

A technical advantage of the described systems and methods includes that the use of a system-wide or shared analytic applications schema or data model, maintained within an analytic applications environment (cloud) tenancy; together with tenant-specific customer schemas, maintained within customer tenancies; enables each customer's (tenant's) data warehouse instance, or database tables, to be populated or otherwise associated with live data (live tables), as received from their enterprise software application or data environment, on an automated or a periodic, e.g., hourly/daily/weekly, or other basis, and reflecting best practices for particular analytics use cases. Examples of such analytics use cases include Enterprise Resource Planning (ERP), Human Capital Management (HCM), Customer Experience (CX), Supply Chain Management (SCM), Enterprise Performance Management (EPM), or other types of analytics use cases. The populated data warehouse instance or database tables can then be used to create computer-executable software analytic applications, or to determine data analytics or other information associated with the data.

In accordance with an embodiment, a computer-executable software analytic application can be associated with a data pipeline or process, such as, for example an extract, transform, load (ETL) process, or an extract, load, transform (ELT) process, maintained by a data integration component, such as, for example, an Oracle Data Integrator (ODI) environment, or other type of data integration component.

In accordance with an embodiment, the analytic applications environment can operate with a data warehouse component, such as, for example an Oracle Autonomous Data Warehouse Cloud (ADWC) environment, or other type of data warehouse component adapted to store large amounts of data; which can be populated via a star schema sourced from an enterprise software application or data environment, such as, for example, an Oracle Fusion Applications, or other type of enterprise software application or data environment. The data made available to each customer (tenant) of the analytic applications environment can be provisioned in an ADWC tenancy that is associated with, and accessible only to, that customer (tenant); while providing access to other features of a shared infrastructure.

For example, in accordance with an embodiment, the analytic applications environment can include a data pipeline or process layer that enables a customer (tenant) to ingest data extracted from their Oracle Fusion Applications environment, to be loaded into a data warehouse instance within their ADWC tenancy, including support for features such as multiple data warehouse schemas, data extract and target schemas, and monitoring of data pipeline or process stages; coupled with a shared data pipeline or process infrastructure that provides common transformation maps or repositories.

Introduction

In accordance with an embodiment, a data warehouse environment or component, such as, for example an Oracle Autonomous Data Warehouse Cloud (ADWC) environment, or other type of data warehouse component adapted to store large amounts of data, can provide a central repository for storage of data collected by one or more business applications.

For example, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence (BI) applications and processes generally face the task of extracting data from their horizontal and vertical business applications, and introducing the extracted data into a data warehouse—a process which can be both time and resource intensive.

In accordance with an embodiment, the analytic applications environment allows customers (tenants) to develop computer-executable software analytic applications for use with a BI component, such as, for example an Oracle Business Intelligence Applications (OBIA) environment, or other type of BI component adapted to examine large amounts of data sourced either by the customer (tenant) itself, or from multiple third-party entities.

For example, when used with a SaaS business productivity software product suite that includes a data warehouse component, the analytic applications environment can be used to populate the data warehouse component with data from the business productivity software applications of the suite. Predefined data integration flows can automate the ETL processing of data between the business productivity software applications and the data warehouse, which processing might have been conventionally or manually performed by the users of those services.

As another example, the analytic applications environment can be pre-configured with database schemas for storing consolidated data sourced across various business productivity software applications of a SaaS product suite. Such pre-configured database schemas can be used to provide uniformity across the productivity software applications and corresponding transactional databases offered in the SaaS product suite; while allowing the user to forgo the process of manually designing, tuning, and modeling the provided data warehouse.

As another example, the analytic applications environment can be used to pre-populate a reporting interface of a data warehouse instance with relevant metadata describing business-related data objects in the context of various business productivity software applications, for example to include predefined dashboards, key performance indicators (KPIs), or other types of reports.

Analytic Applications Environment

FIG. 1 illustrates a system for providing an analytic applications environment, in accordance with an embodiment.

As illustrated in FIG. 1, in accordance with an embodiment, an analytic applications environment 100 can be provided by, or otherwise operate at, a computer system having a computer hardware (e.g., processor, memory) 101, and including one or more software components operating as a control plane 102, and a data plane 104, and providing access to a data warehouse, or data warehouse instance 160.

The components and processes illustrated in FIG. 1, and as further described herein with regard to various other embodiments, can be provided as software or program code executable by a computer system or other type of processing device.

For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example an Oracle Analytics Cloud or Oracle Cloud Infrastructure environment, or other type of cloud environment.

For example, the control plane can include a console interface 110 that enables access by a client computer device 10 having a device hardware 12, administrative application 14, and user interface 16, under control of a customer (tenant) 20 and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants).

For example, the console interface can provide interfaces that allow customers to provision services for use within their SaaS environment, and to configure those services that have been provisioned.

In accordance with an embodiment, the provisioning component can include various functionality to provision services that are specified by provisioning commands.

For example, the provisioning component can be accessed and utilized, via the console interface, by a customer (tenant) to purchase one or more of a suite of business productivity software applications, together with a data warehouse instance for use with those software applications.

A customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

The provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane.

For example, provisioning and configuration changes directed to services provided by the data plane can be communicated to the data plane via the data plane API.

In accordance with an embodiment, the metering manager can include various functionality that meters services and usage of services provisioned through control plane.

For example, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

To support multiple tenants, the system can enable the use of multiple data warehouses or data warehouse instances.

For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data.

For example, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset includes no dependencies on any other model data set; and a second model data set includes dependencies to the first model data set; then the monitoring component can determine to transform the first data set before the second data set, to accommodate the second data set's dependencies on the first data set.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

For example, dimensions can include categories of data such as, for example, "name," "address," or "age". Fact generation includes the generation of values that data can take, or "measures." Facts are associated with appropriate dimensions in the data warehouse instance. Aggregate generation includes creation of data mappings which compute aggregations of the transformed data to existing data in the customer schema 164 of data warehouse instance.

In accordance with an embodiment, once any transformations are in place (as defined by the data model), the data pipeline or process can read the source data, apply the transformation, and then push the data to the data warehouse instance.

Data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Horizontally and vertically integrated business software applications are generally directed to capturing of data in real time. This is a result of horizontally and vertically integrated business software applications being generally used for daily workflow, and storing data in a transactional database, which means that only the most current data is generally stored in such databases.

For example, while a HCM application might update a record associated with an employee when the employee transfers offices, such HCM application would generally not maintain a record of each office that the employee had worked in during their tenure with a company. As such, a BI-related query seeking to determine employee mobility within a company would not have adequate records within the transaction database to complete such a query.

In accordance with an embodiment, by storing historical, in addition to current data, generated by the horizontally and vertically integrated business software applications, in a context that is readily understandable by BI applications, the data warehouse instance as populated using the above technique provides a resource for BI applications to process such queries, using an interface provided, for example, by a business productivity and analytics product suite, or by a SQL tool of the customer's choice.

Data Pipeline Process

Figure 2:
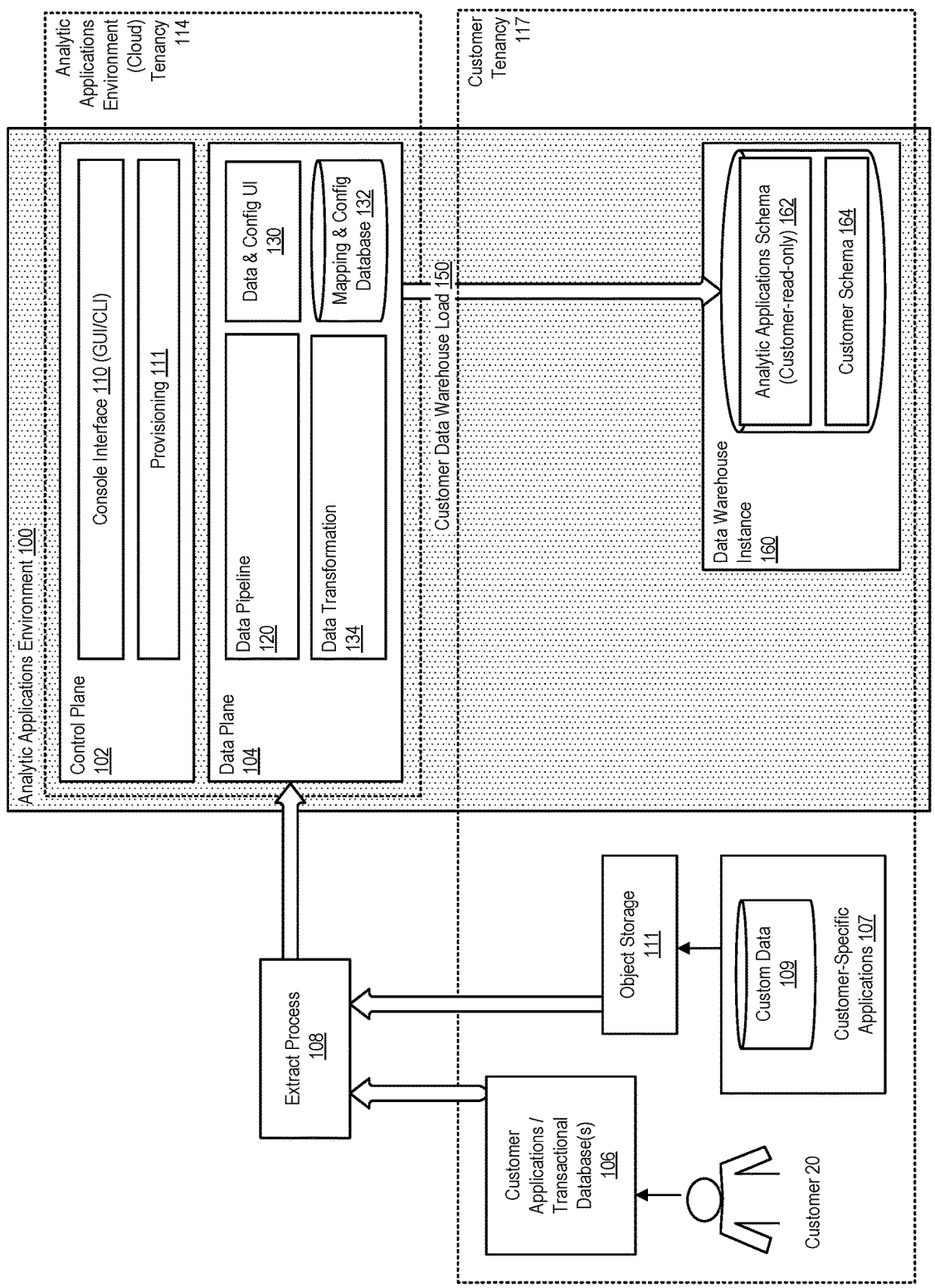
FIG. 2 further illustrates a system for providing an analytic applications environment, in accordance with an embodiment.

FIG. 2 further illustrates a system for providing an analytic applications environment, in accordance with an embodiment.

As illustrated in FIG. 2, in accordance with an embodiment, data can be sourced, e.g., from a customer's (tenant's) enterprise software application or data environment (106), using the data pipeline process as described above; or as custom data 109 sourced from one or more customer-specific applications 107; and loaded to a data warehouse instance, including in some examples the use of an object storage 105 for storage of the data.

In accordance with an embodiment, the data pipeline or process maintains, for each customer (tenant), an analytic applications schema, e.g., as a star schema, that is updated on a periodic or other basis, by the system in accordance with best practices for a particular analytics use case, e.g., human capital management (HCM) analytics, or enterprise resource planning (ERP) analytics.

In accordance with an embodiment, for each customer (tenant), the system uses the analytic applications schema that is maintained and updated by the system, within an analytic applications environment (cloud) tenancy 114, to pre-populate a data warehouse instance for the customer, based on an analysis of the data within that customer's enterprise applications environment, and within a customer tenancy 117. As such, the analytic applications schema maintained by the system enables data to be retrieved, by the data pipeline or process, from the customer's environment, and loaded to the customer's data warehouse instance in a "live" manner.

In accordance with an embodiment, the analytic applications environment also provides, for each customer of the environment, a customer schema that is readily modifiable by the customer, and which allows the customer to supplement and utilize the data within their own data warehouse instance. For each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics For example, in accordance with an embodiment, a data warehouse (e.g., an Oracle Autonomous Data Warehouse, ADWC) can include an analytic applications schema and, for each customer/tenant, a customer schema sourced from their enterprise software application or data environment. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

For a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Extraction, Transformation, Load/Publish

Figure 3:
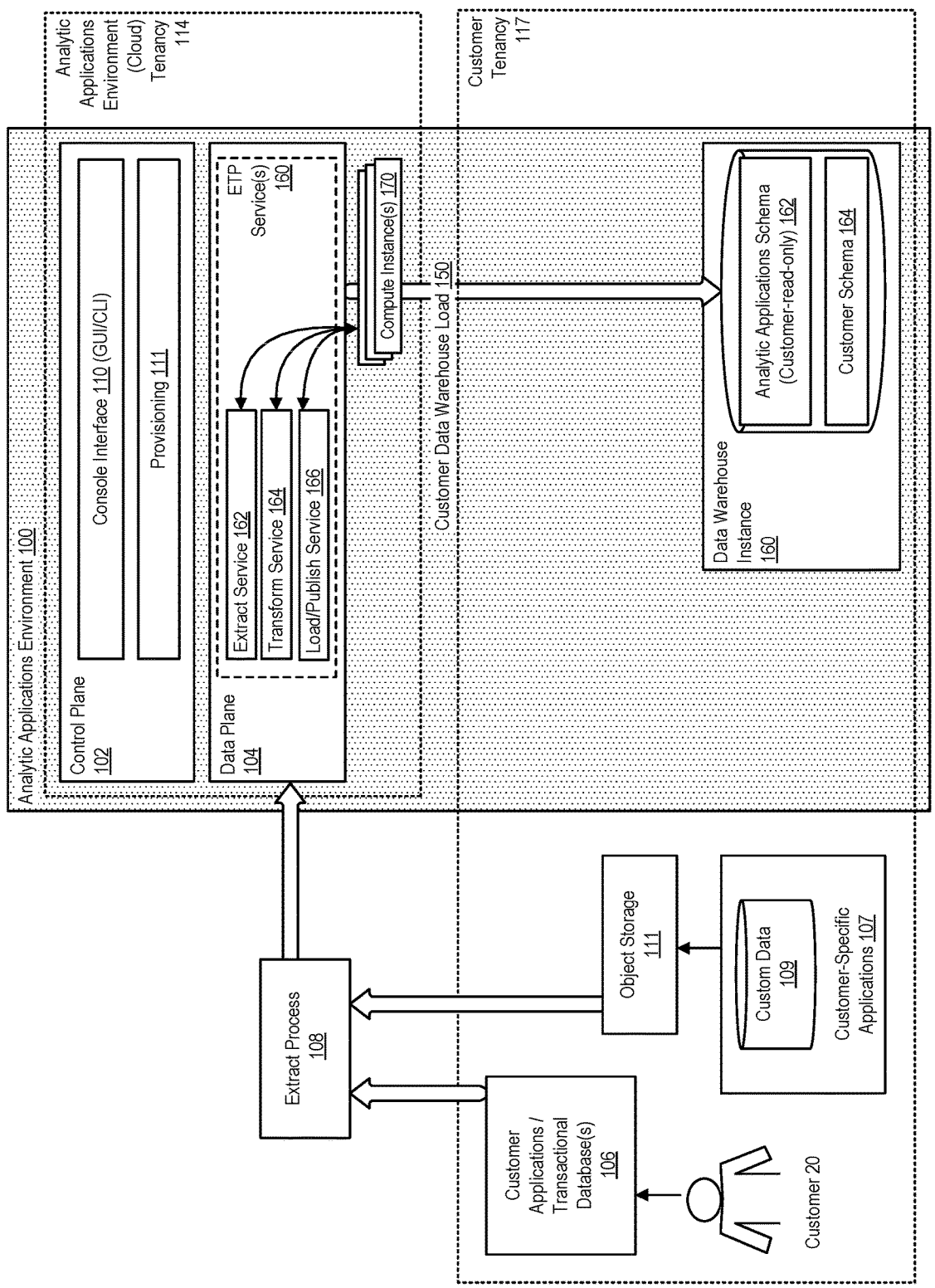
FIG. 3 further illustrates a system for providing an analytic applications environment, in accordance with an embodiment.

FIG. 3 further illustrates a system for providing an analytic applications environment, in accordance with an embodiment.

As illustrated in FIG. 3, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

Extraction: in accordance with an embodiment, a list of view objects for extractions can be submitted, for example, to an Oracle BI cloud connector (BICC) component via a ReST call. The extracted files can be uploaded to an object storage component, for example an Oracle Storage Service (OSS) component, for storage of the data.

Transformation: In accordance with an embodiment, the transformation process takes the data files from object storage component (e.g., OSS), and applies a business logic while loading them to a target data warehouse, e.g., ADWC database, which is internal to the data pipeline or process, and is not exposed to the customer (tenant).

Load/Publish: In accordance with an embodiment, a load/publish service or process takes the data from the, e.g., IADW warehouse, and publishes it to a data warehouse instance that is accessible to the customer (tenant).

Multiple Customers (Tenants)

Figure 4:
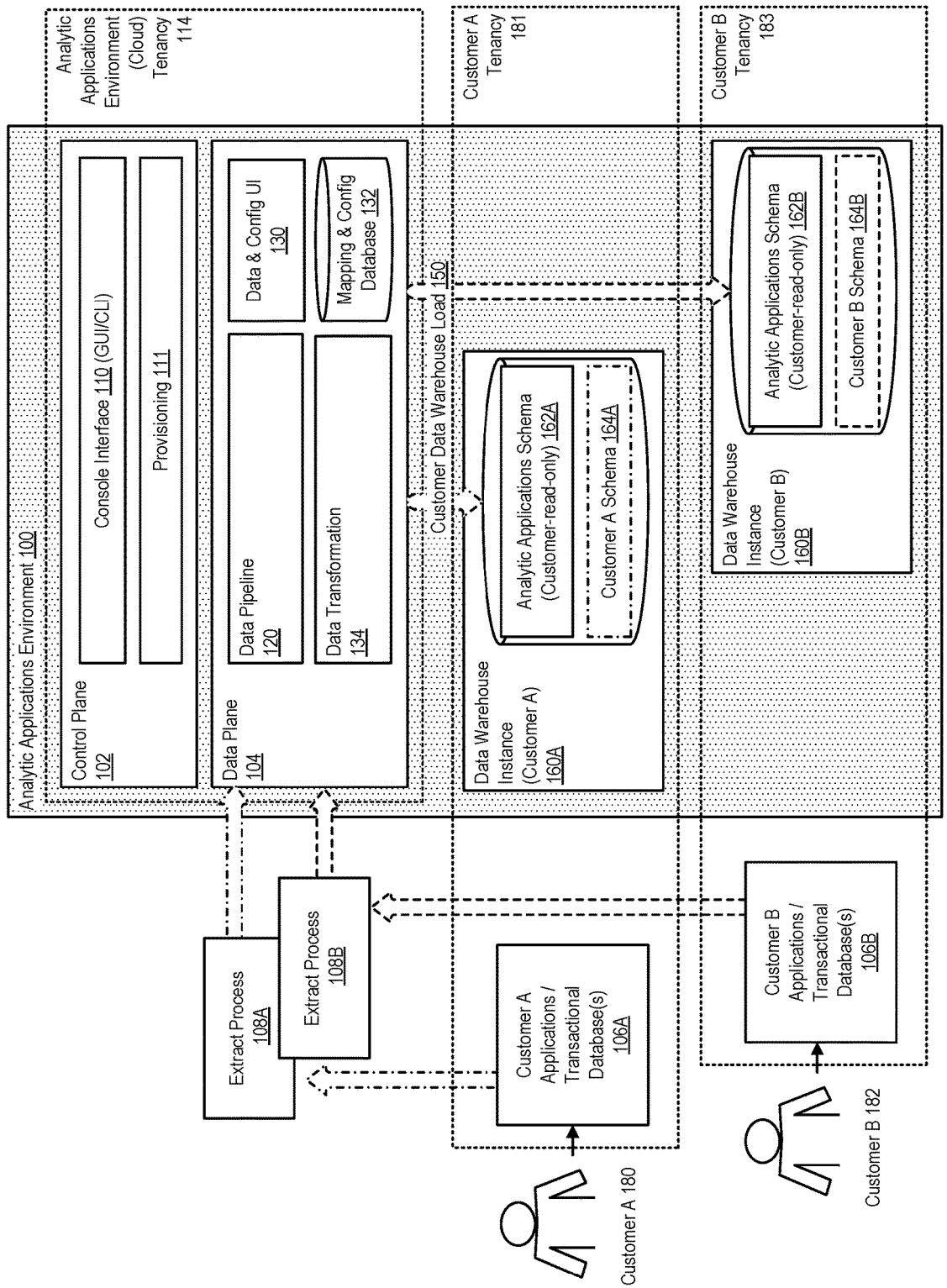
FIG. 4 further illustrates a system for providing an analytic applications environment, in accordance with an embodiment.

FIG. 4 further illustrates a system for providing an analytic applications environment, in accordance with an embodiment.

As illustrated in FIG. 4, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, an analytic applications schema that is updated on a periodic or other basis, by the system in accordance with best practices for a particular analytics use case.

For each of a plurality of customers (e.g., customers A, B), the system uses the analytic applications schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the analytic applications environment also provides, for each of a plurality of customers of the environment, a customer schema 164A, 164B that is readily modifiable by the customer, and which allows the customer to supplement and utilize the data within their own data warehouse instance.

As described above, for each of a plurality of customers of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

Activation Plans

Figure 5:
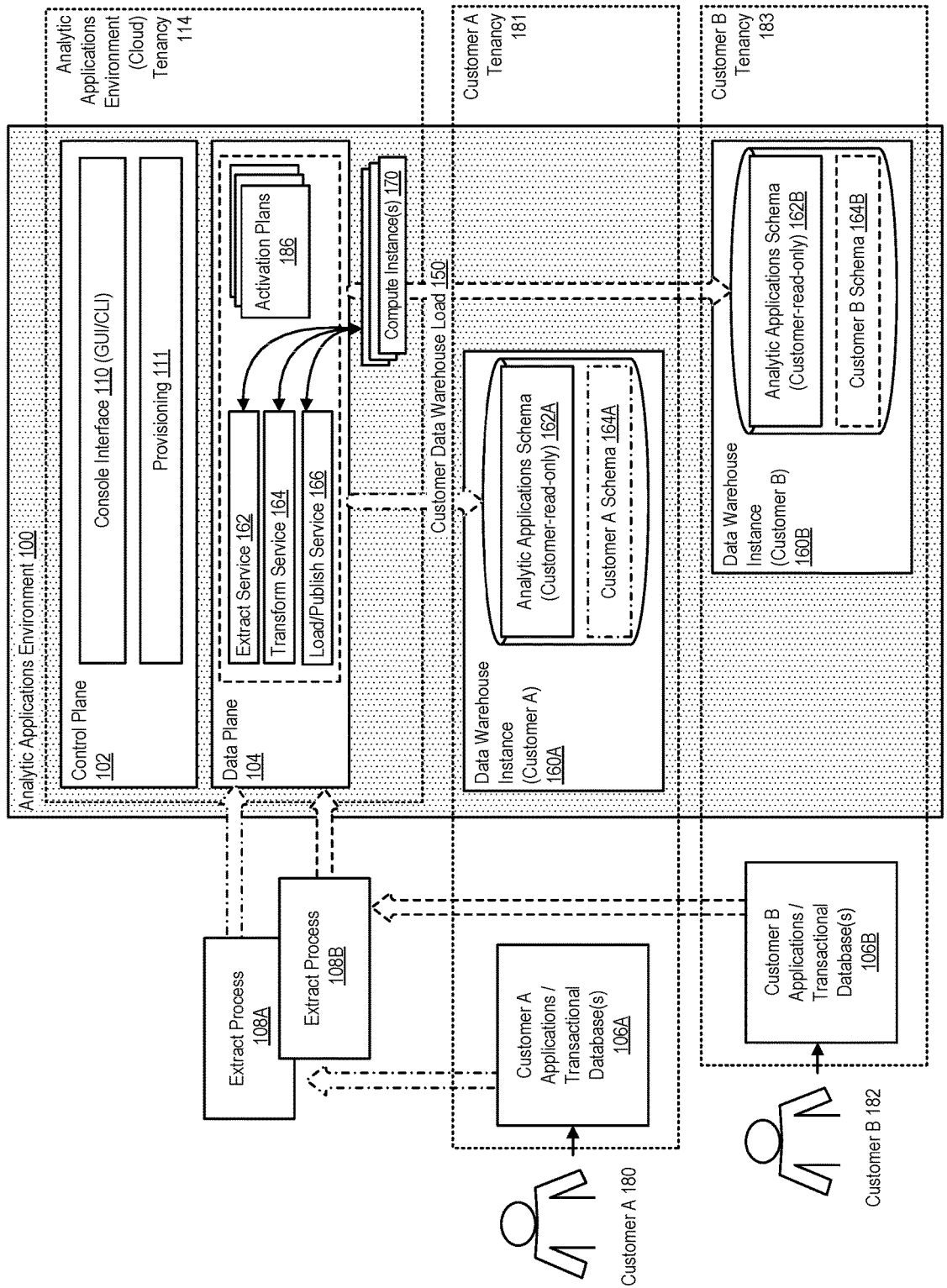
FIG. 5 further illustrates a system for providing an analytic applications environment, in accordance with an embodiment.

FIG. 5 further illustrates a system for providing an analytic applications environment, in accordance with an embodiment.

In accordance with an embodiment, activation plans 186 can be used to control the operation of the data pipeline or process services for a customer, for a particular functional area, to address that customer's (tenant's) particular needs.

For example, an activation plan can define a number of extract, transform, and load (publish) services or steps to be run in a certain order, at a certain time of day, and within a certain window of time.

Each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

In accordance with an embodiment, activation plans can be stored in the mapping and configuration database and are customizable by the customer via the data and configuration UI. Each customer can have a number of activation plans. Compute instances/services (virtual machines) which execute the ETL process for various customers, according to their activation plans, can be dedicated to a particular service for the use of an activation plan, and then released for use by other services and activation plans.

In accordance with an embodiment, based on a determination of historical performance data recorded over a period of time, the system can optimize the execution of activation plans, e.g., for one or more functional areas associated with a particular tenant, or across a sequence of activation plans associated with multiple tenants, to address utilization of the VMs and service level agreements (SLAs) for those tenants. Such historical data can include statistics of load volumes and load times.

For example, the historical data can include size of extraction, count of extraction, extraction time, size of warehouse, transform time, publish (load) time, view object extract size, view object extract record count, view object extract time, warehouse table count, count of records processed for a table, warehouse table transform time, publish table count, and publish time. Such historical data can be used to estimate and plan current and future activation plans in order to organize various tasks to, such as, for example, run in sequence or in parallel to arrive at a minimum time to run an activation plan. In addition, the gathered historical data can be used to optimize across multiple activation plans for a tenant. In some embodiments, the optimization of activation plans (i.e., a particular sequence of jobs, such as ETLs) based upon historical data can be automatic.

ETL Process Flow

Figure 6:
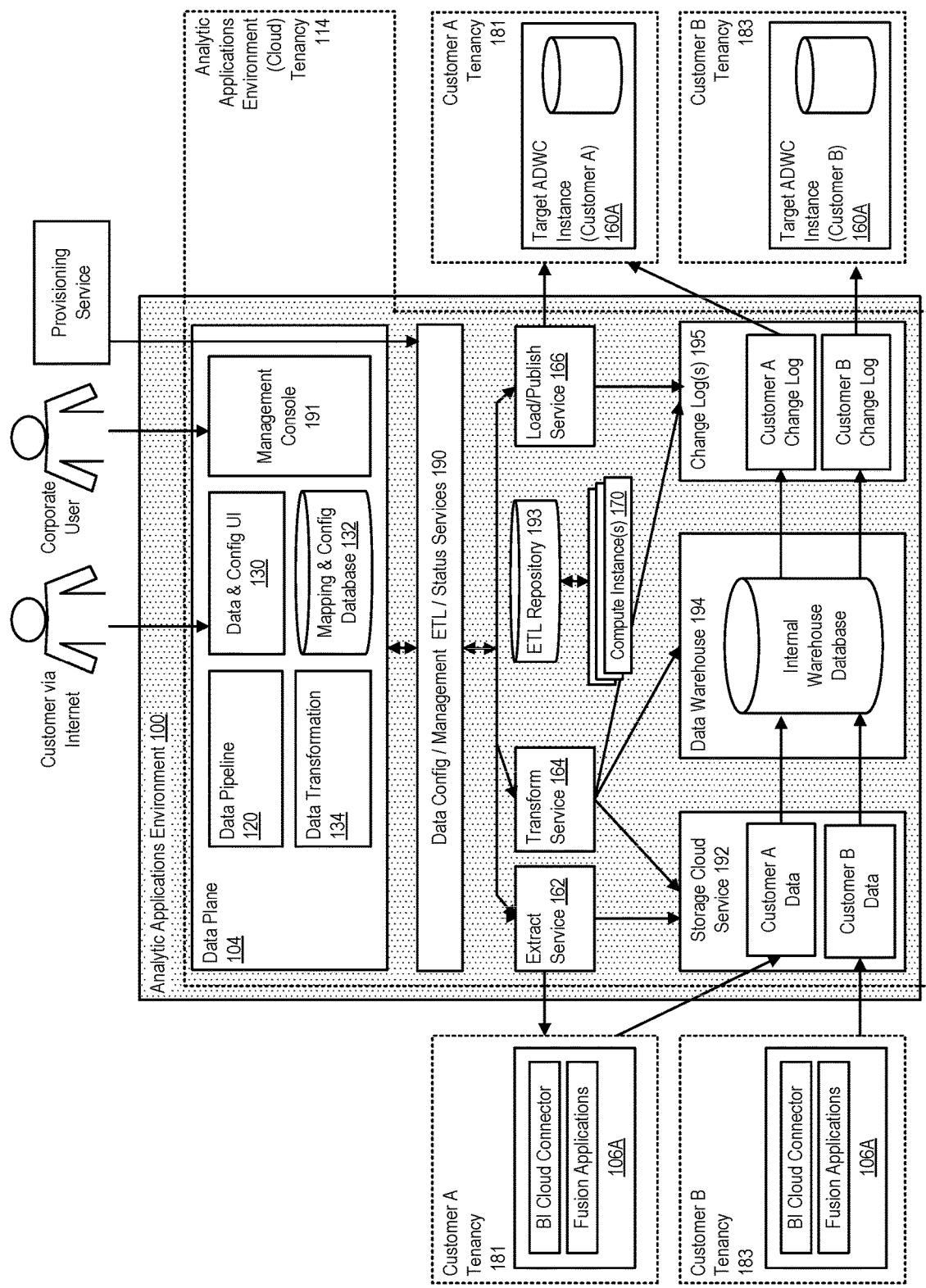
FIG. 6 further illustrates a system for providing an analytic applications environment, in accordance with an embodiment.

FIG. 6 further illustrates a system for providing an analytic applications environment, in accordance with an embodiment.

As illustrated in FIG. 6, in accordance with an embodiment, the system enables a flow of data, controlled by a data config/management/ETL//status services 190 within an (e.g., Oracle) managed tenancy, from each customer's enterprise software application environment (e.g., their Fusion Applications environment), including in this example, a BICC component, via a storage cloud service 192, e.g., OSS, and from there to a data warehouse instance.

As described above, in accordance with an embodiment, the flow of data can be managed by one or more services, including for example, an extract service, and a transform service as described above, and with reference to an ETL repository 193, that takes the data from the storage cloud service, and loads the data into an internal target data warehouse (e.g., IADW) 194, which is internal to the data pipeline or process and is not exposed to the customer.

In accordance with an embodiment, data is moved in stages into the data warehouse, and thereafter into database table change logs 195, from where the load/publish service can load the customer data into a target data warehouse instance associated with and accessible by the customer, within its customer tenancy.

ETL Stages

Figure 7:
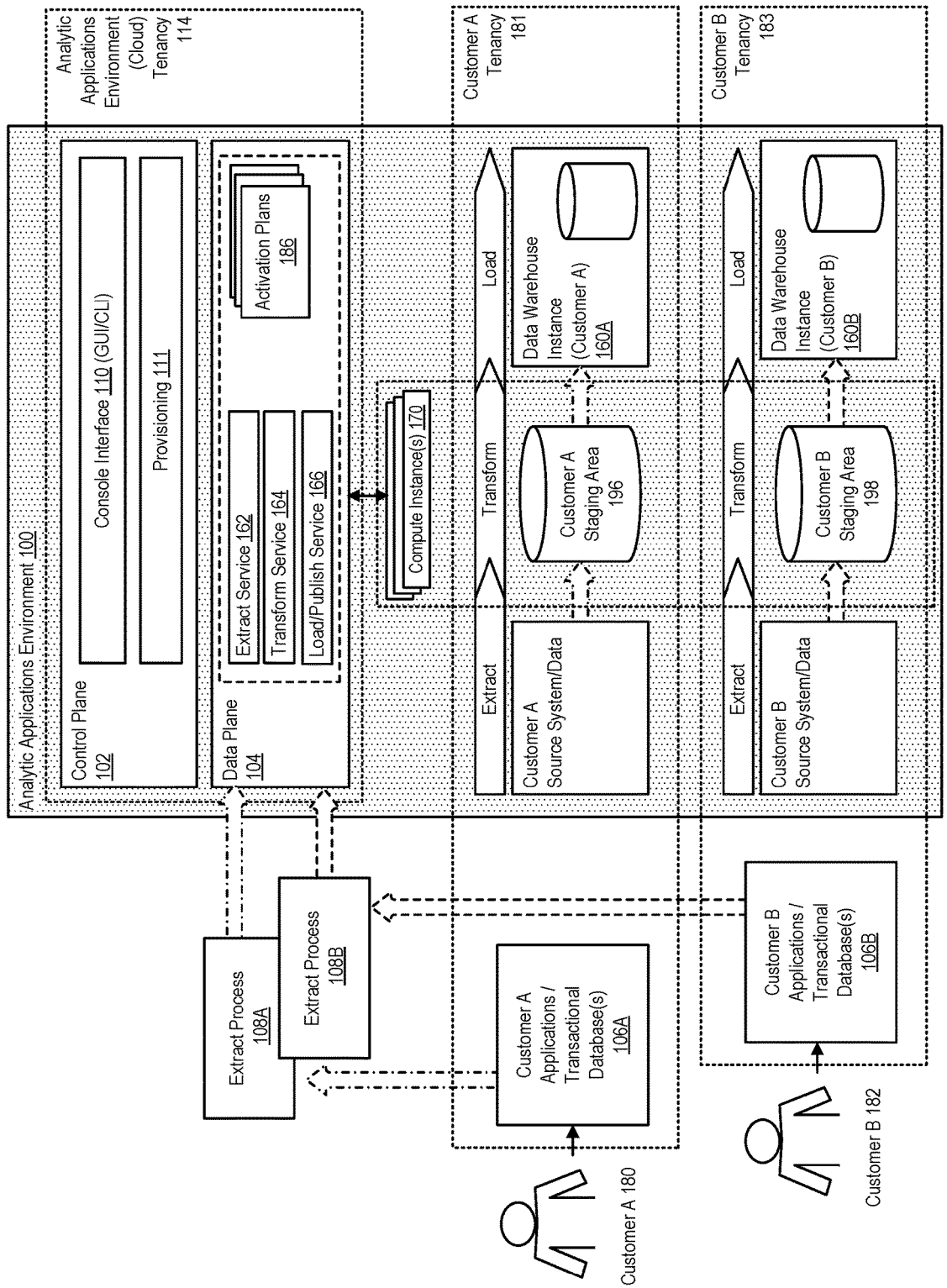
FIG. 7 further illustrates a system for providing an analytic applications environment, in accordance with an embodiment.

FIG. 7 further illustrates a system for providing an analytic applications environment, in accordance with an embodiment.

In accordance with an embodiment, the extracting, transforming and loading data from enterprise applications to a data warehouse instance involves multiple stages, and each stage can have several sequential or parallel jobs; and run on different spaces/hardware, including different staging areas 196, 198 for each customer.

Analytic Applications Environment Metrics

Figure 8:
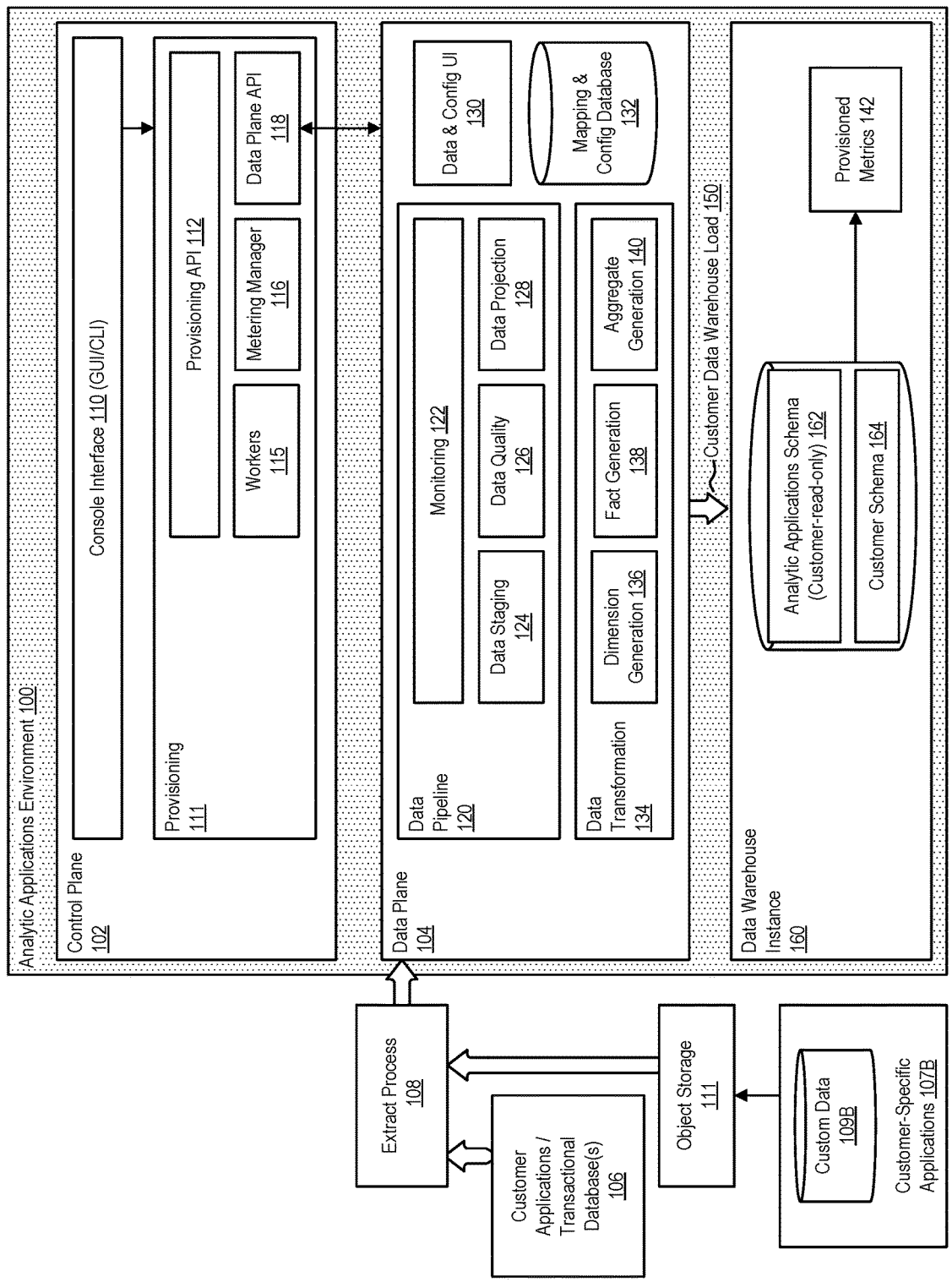
FIG. 8 further illustrates a system for providing an analytic applications environment, in accordance with an embodiment.

FIG. 8 further illustrates a system for providing an analytic applications environment, in accordance with an embodiment.

As illustrated in FIG. 8, in accordance with an embodiment, the metering manager can include functionality that meters services and usage of services provisioned through the control plane, and provide provisioned metrics 142.

For example, the metering manager can record a usage over time of processors provisioned via the control plane, for particular customers, for billing purposes. Likewise, the metering manager can record an amount of storage space of data warehouse partitioned for use by a customer of the SaaS environment, for billing purposes.

Analytic Applications Environment Customization

Figure 9:
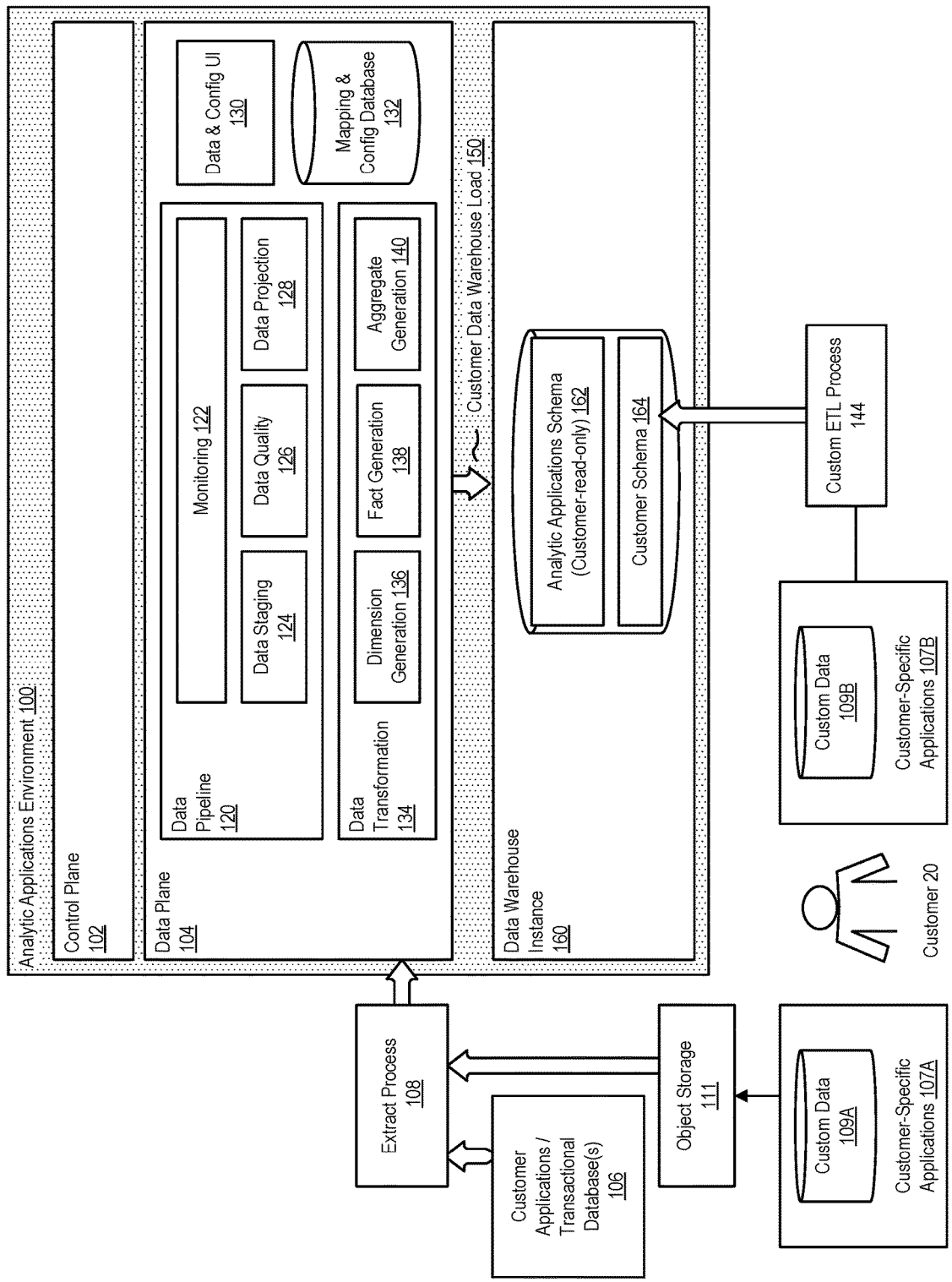
FIG. 9 further illustrates a system for providing an analytic applications environment, in accordance with an embodiment.

FIG. 9 further illustrates a system for providing an analytic applications environment, in accordance with an embodiment.

As illustrated in FIG. 9, in accordance with an embodiment, in addition to data that can be sourced, e.g., from a customer's enterprise software application or data environment, using the data pipeline process as described above; one or more additional custom data 109A, 109B, that is sourced from one or more customer-specific applications 107A, 107B, can also be extracted, transformed, and loaded to a data warehouse instance, using either: the data pipeline process as described above, including in some examples the use of an object storage for storage of the data; and/or a custom ETL or other process 144 that is mutable from the customer's perspective. Once data has been loaded into their data warehouse instance, customers can create business database views that combine tables from both their customer schema and the software analytic application schema; and can query their data warehouse instance using an interface provided, for example, by a business productivity and analytics product suite, or by a SQL tool of the customer's choice.

Analytic Applications Environment Method

Figure 10:
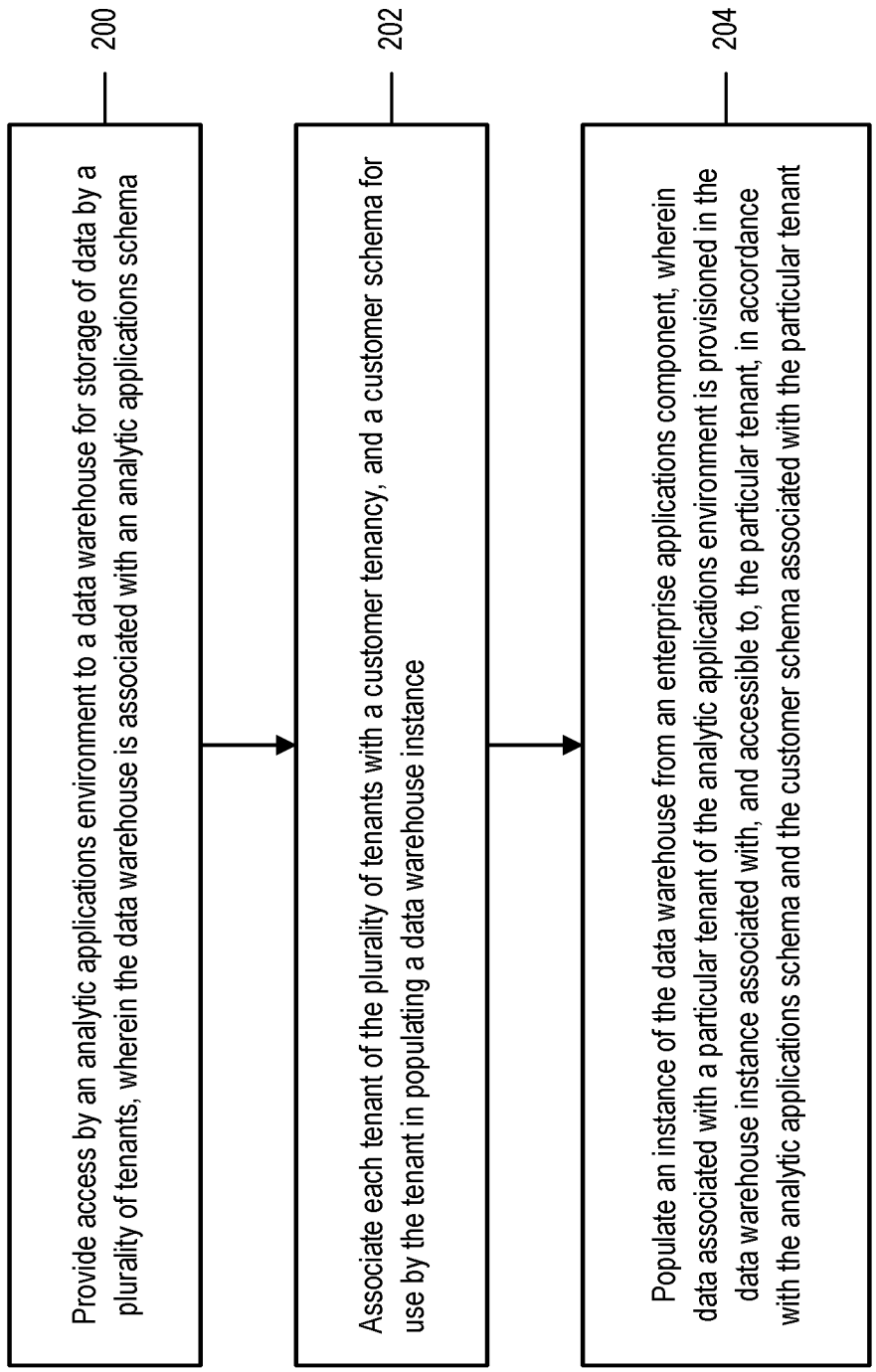
FIG. 10 illustrates a flowchart of a method for providing an analytic applications environment, in accordance with an embodiment.

FIG. 10 illustrates a flowchart of a method for providing an analytic applications environment, in accordance with an embodiment.

As illustrated in FIG. 10, in accordance with an embodiment, at step 200, an analytic applications environment provides access to a data warehouse for storage of data by a plurality of tenants, wherein the data warehouse is associated with an analytic applications schema.

At step 202, each tenant of the plurality of tenants is associated with a customer tenancy, and a customer schema for use by the tenant in populating a data warehouse instance.

At step 204, an instance of the data warehouse is populated with data received from an enterprise software application or data environment, wherein data associated with a particular tenant of the analytic applications environment is provisioned in the data warehouse instance associated with, and accessible to, the particular tenant, in accordance with the analytic applications schema and the customer schema associated with the particular tenant.

Multiple Tenant Support of ETL Repository/Server

In accordance with an embodiment, in traditional business intelligence systems, different customers or tenants (e.g., different companies, different departments within a same company, etc.) were generally allotted separate systems in which one (or more, dependent upon the requirements of the tenant) setup was provisioned for each customer/tenant. This setup included, for example, instances of a data integration system, as well as extract, transform, and load methods. As well, each customer was provided with a dedicated repository along with the other components.

In accordance with an embodiment, however, one of the drawbacks of such configurations was the wasted resources associated with ETL systems. While each customer was allocated a separate ETL system, once the customer had imported their data, and excepting scheduled data pulls, the ETL systems sat idle, representing an inefficient use of resources.

In accordance with an embodiment, the systems and methods herein can provide multiple-tenant support of ETL Repository/Server.

In accordance with an embodiment, the following terminology may be used in conjunction with the description of embodiments herein.

In accordance with an embodiment, the term ODI Repository can refer to a repository for a data integration tools that comprises a metadata repository and stores information about the source tables, target warehouse tables, the transformation logic (mappings). Keeping the customer's customizations aside, this metadata would ideally be the same across customers.

In accordance with an embodiment, the terms topology/connections can refer to the process of connecting to a source, fetching data, and then loading the data at the target. When systems and methods perform an ETL process, the systems and methods connect to the source, fetch data and then load the target. All of this connection information can be referred to as topology/connections.

In accordance with an embodiment, the term agent can refer to an orchestrator for use in an ETL process. When systems and methods herein run an ETL job (or an ODI Load plan), an agent can be put in place to orchestrate the ETL (or multiple ETL) jobs. The agent can be responsible, for example, for ordering multiple ETL processes from a single source such that dependencies are maintained. As an example, of ETL job A and ETL job B are scheduled to be run, but ETL job B comprises records that are dependent on records in ETL job A, then the agent can ensure that ETL job A runs first, such that there are no dependency errors in ETL job B on running.

In accordance with an embodiment, the terms source and target can refer to a source system where data subject to an ETL is extracted from, and a target system is the system where data subject to an ETL is targeted to be loaded. In accordance with embodiments herein, the terms source and target can refer to a tenant specific source and target, such that data between sources and targets of different tenants is not shared or co-mingled.

Figure 11:
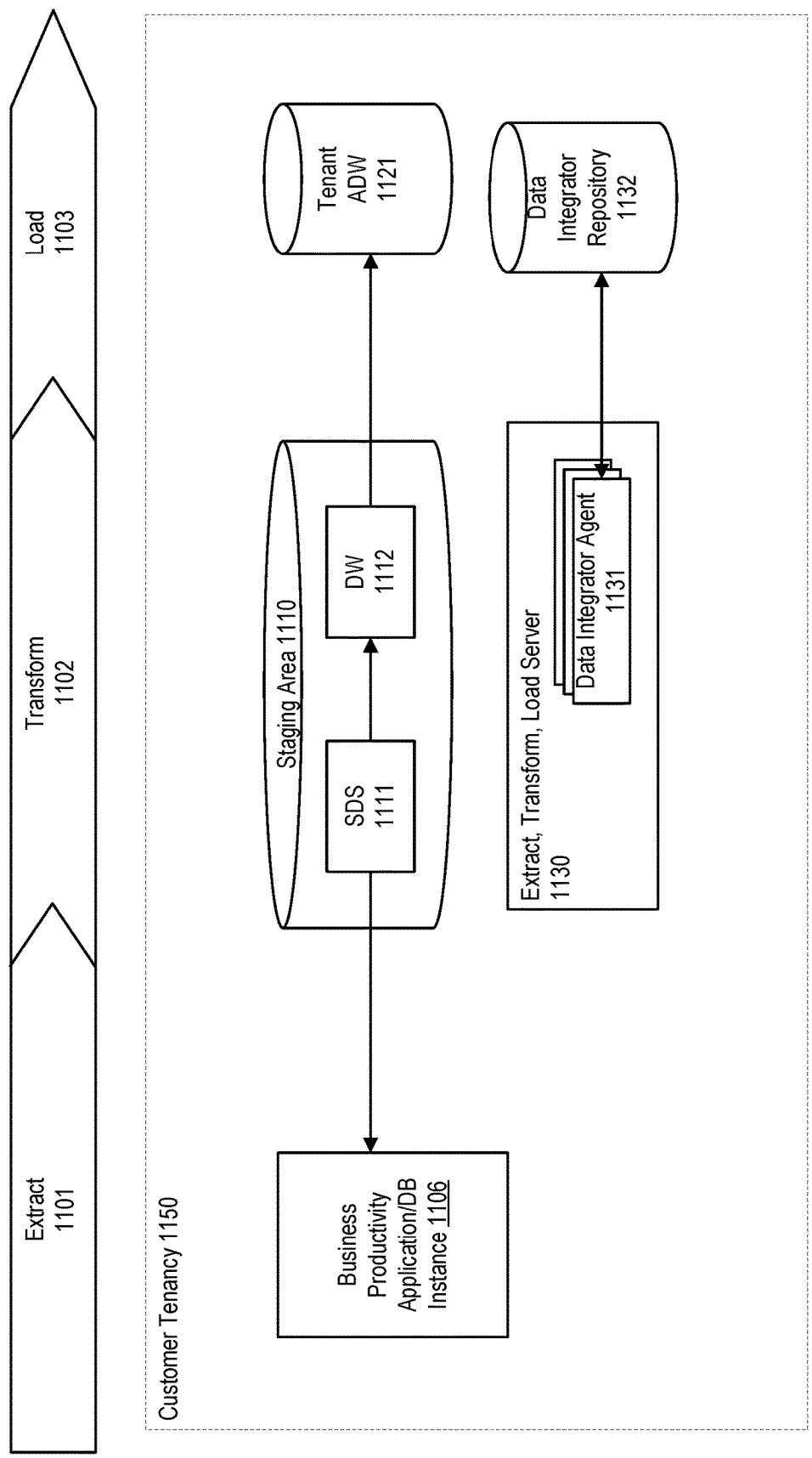
FIG. 11 shows a system for traditional ETL, in accordance with an embodiment.

FIG. 11 shows a system for traditional ETL, in accordance with an embodiment.

More specifically, FIG. 11 shows a traditional ETL process where one tenant "owns", the resources associated with the ETL process.

In accordance with an embodiment, a traditional. ETL comprises three primary phases: extract 1101, transform 1102, and load 1103. In the extract phase, within a customer tenancy 1150, a customer has a source, such as a business productivity application/database instance 1106. The data can be moved to a staging area 1110 where all the transformations are carried out. These transformations can involve the transformation from a source data schema (SDS) 1111 to a data warehouse schema (DW) 1112. Finally, the transformed data can be pushed/loaded/published to a tenant autonomous data warehouse (ADW) 1121. This transformed data that has been loaded into the tenant ADW can then be published to a place that the end user would consume it from (e.g., from within an analytics application).

In accordance with an embodiment, in traditional systems, each customer tenancy 1150 was associated with at least one extract, transform, load (ETL) server 1130, where each ETL server was associated with a number of data integrator agents 1131. It was these ETL servers that carried out the ETL process for the customer. The data integrator agent(s) on the ETL Server was the orchestrator for this entire process. The data integrator agent relied on metadata stored in the ETL metadata repository database (e.g., ODI repository) 1132 to perform the ETL process.

In accordance with an embodiment, however, whenever the tenant associated with customer tenancy 1150 was not in the process of performing an ETL, the ETL server, agents, and repository each sat idle, which is an inefficient use of resources.

Figure 12:
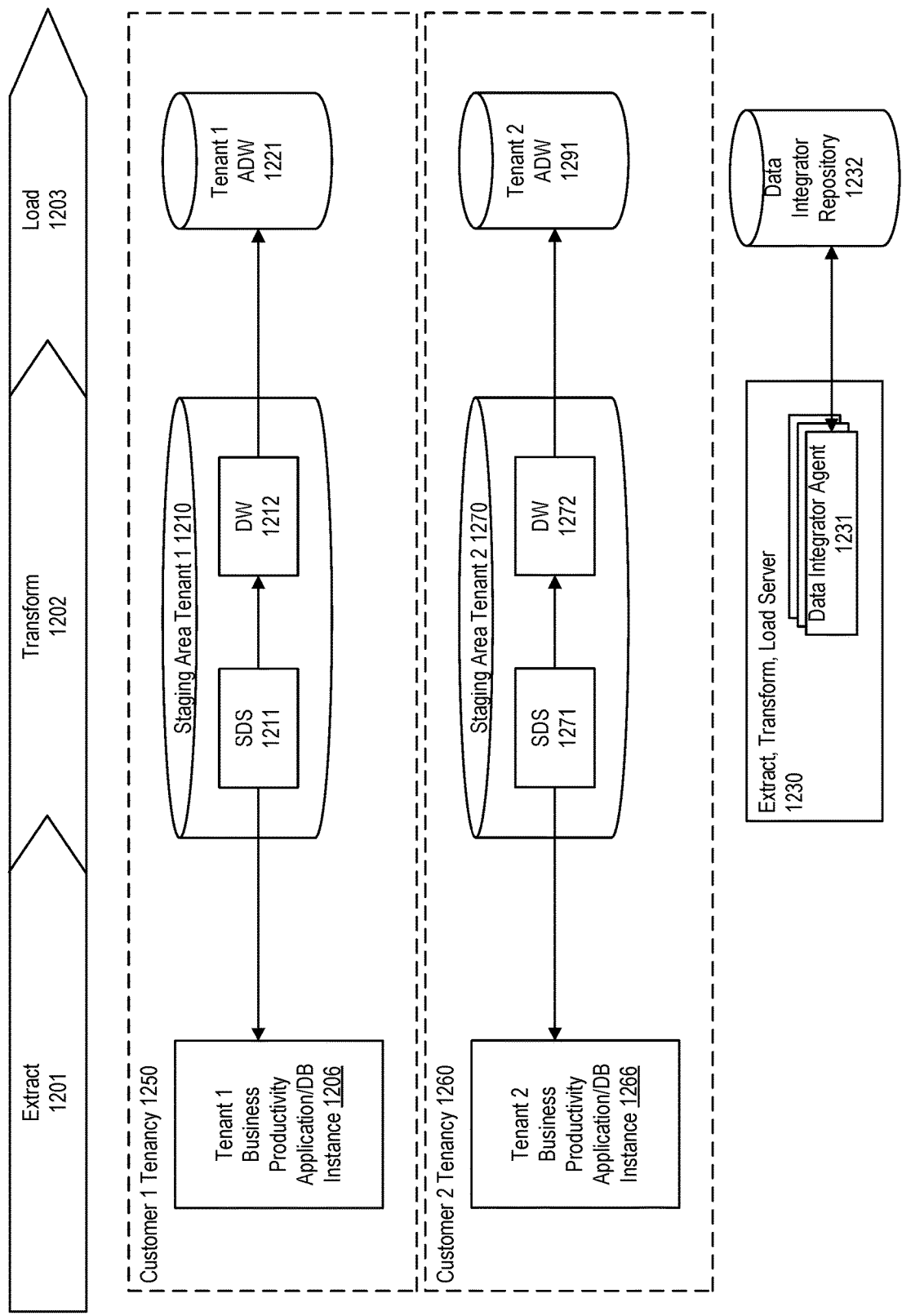
FIG. 12 shows a system for running warehouse loads for multiple tenants of a data warehouse, in accordance with an embodiment.

FIG. 12 shows a system for running warehouse loads for multiple tenants of a data warehouse, in accordance with an embodiment.

More specifically, FIG. 12 shows a multitenant ETL process where the resources of a single ETL server are shared amount multiple tenants, in accordance with an embodiment.

In accordance with an embodiment, such a multitenant supported ETL comprises three primary phases: extract 1201, transform 1202, and load 1203. In the extract phase, within a customer tenancy 1250 or 1260, depending upon which tenancy is currently performing ETL (or simultaneously in certain circumstances), each tenant may have a different source of data has a source, such as a business productivity application/database instance 1206 or 1266. The data can be moved to each tenant's respective staging area 1210 or 1270, where all the transformations are carried out. These transformations can involve the transformation from a source data schema (SDS) 1211 1271 to a data warehouse schema (DW) 1212 1272. Finally, the transformed data can be pushed/loaded/published to a respective tenant's autonomous data warehouse (ADW) 1221 or 1291. This transformed data that has been loaded into the tenant ADW can then be published to a place that the end user would consume it from (e.g., from within an analytics application).

In accordance with an embodiment, it is important to note that each tenant's data is kept separate during this entire process. Each tenant maintains control and ownership over the tenant staging area where data is transformed. As well, each tenant maintains ownership and control over their respective sources, as well as the targets (e.g. the autonomous data warehouses).

In accordance with an embodiment, while the source/staging/target databases are specific to the customers/tenants, the ETL server 1230, agents 1231, and ETL metadata 1232 supports multiple tenants as it can cater to the ETL requests of multiple customers/tenants. While a tenant's source system is unique to a tenant, and while the target warehouse is generally also provisioned to the tenant's specifications (and is also kept private for security reasons), the ETL server 1230 that is orchestrating the ETL, is shared across customers/tenants. This results in better optimization of resources. Such sharing of the ETL resources also allows for easier updates and maintenance of the ETL server/agents/repository as patching one instance of the ETL resources provides the patch to multiple tenants.

In accordance with an embodiment, connections, customizations, and the enablement of resource availability is continued to be provided by the above described systems and methods.

In accordance with an embodiment, the systems and methods can provide for connections/topology for multiple tenants to be supported by a single data integrator/ETL server. A data integrator, which can comprise the ETL server/agents/repository can comprise a logical schema and physical schema. When a tenant designs a model and mappings of an ETL, the design is against a logical schema. When such mappings are run, the ETL creates a physical schema which is the actual connection against which the mapping is run. A context is then created which is a mapping of all the logical schemas in the repository to the physical schemas.

Therefore, in accordance with an embodiment, within the data integrator repository 1232, logical schemas are first created. These schemas have occurrence in the repository for a given source/target schema. For each of the tenants, then, the following is performed. First, a physical schema is created for each of the logical schemas present. Second, a context is created that maps these physical schemas to the logical schemas. This is unique for each tenant instance.

In accordance with an embodiment, when a load plan runs, the load plan necessarily identifies the context against which the load plan is to be run. Since the context is unique and contains the mapping to the physical schemas corresponding to that customer, the load plan will get the data from the corresponding customer's source system and load the warehouse for that customer.

In accordance with an embodiment, the systems and methods can provide for customization by multiple tenants supported by a single data integrator. Customizations are unique to each customer, and as such, all customizations are stored in the customer database (not shared). When the mapping is run, the ETL resources can query that customer's database and form the query dynamically. That way the same metadata can be used to handle customization that in unique to each customer.

In accordance with an embodiment, the systems and methods can provide for resource availability by multiple tenants supported by a single data integrator. In embodiments, the ETL resources (e.g., server, agents, and repository) can use agents. A data integrator agent generally comprises an orchestrator. Such data integrators run the relevant mappings in the sequence specified in the load plan and are responsible for firing the appropriate queries to the source/target databases. One data integrator repository can have multiple agents. A particular run of a load plan can be targeted at a particular agent. So by having a cluster of data integrator agents, when a system submits multiple ETL runs for multiple tenants in parallel, the data integrator can service the requests appropriately by increasing the number of agents to a repository when the system needs to scale out. Agents also have a parameter specifying the number of threads that can be run in parallel. The agents are as such not dedicated to a customer/tenant. Instead depending on the concurrent load that the platform is sized for, the ETL server can have many agents running. When the ETL server runs a load plan, the request is sent to the agent that is free. Since the state of the load plan is stored in the data integrator repository, which is common for all the agents, this allows for monitoring if the state of the load plan using any other agent. Load plans can also be restarted using a different agent (Whatever is free when the load plan is restarted).

In accordance with an embodiment, when multiple ETL processes are running in parallel, the agents deployed to/allocated in conjunction with each separate ETL process are exclusionary from each other. That is, each set of ETL agents deployed/allocated to each ETL process cannot concurrently be deployed/allocated to a different ETL process that is currently running.

In accordance with an embodiment, while only 2 customer tenancies are shown in FIG. 12, one of skill in the art would readily understand that more customer tenancies can be supported in such a system, where each customer tenancy is still supported by the shared ETL server.

Figure 13:
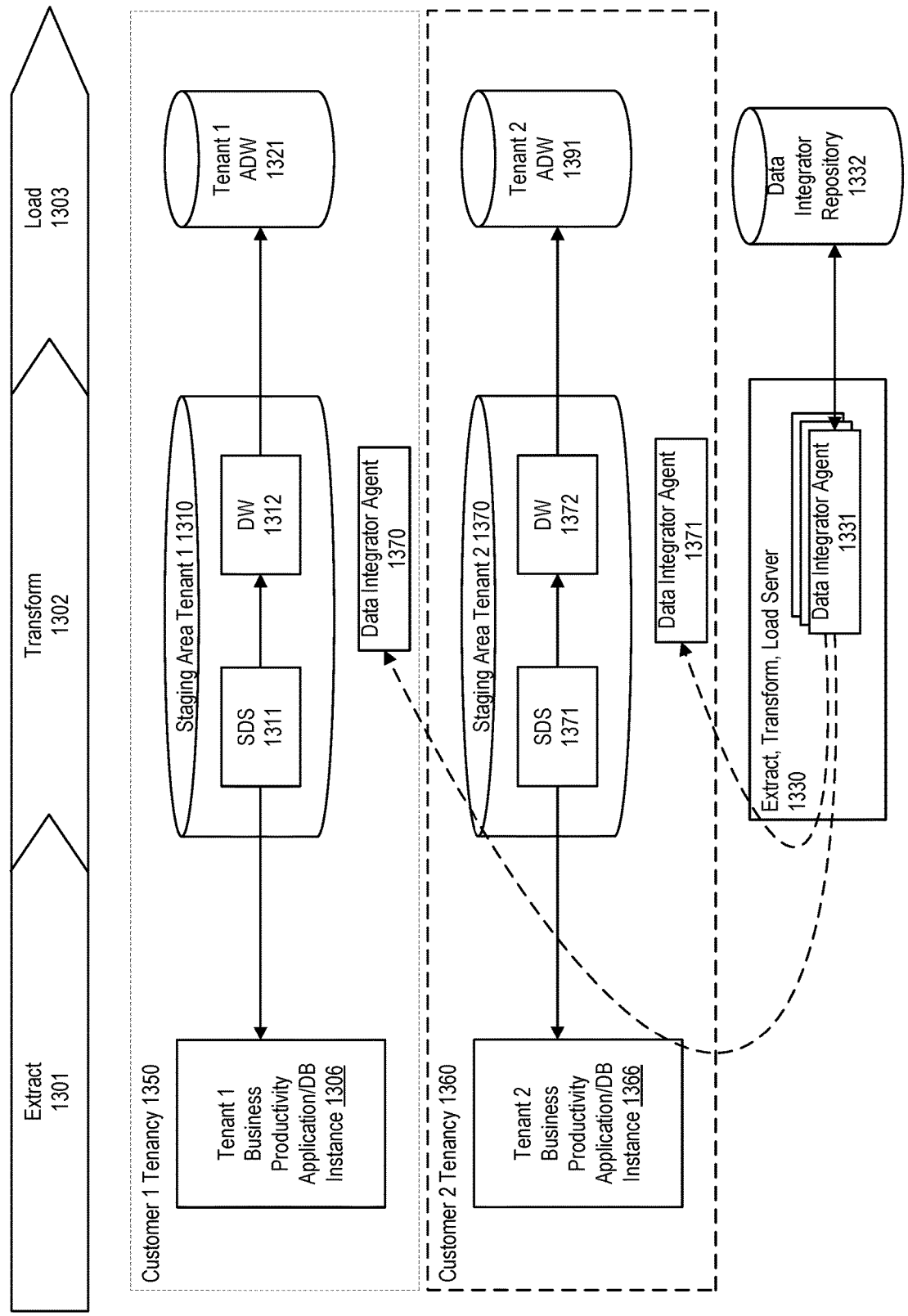
FIG. 13 shows a system for running warehouse loads for multiple tenants of a data warehouse, in accordance with an embodiment.

FIG. 13 shows a system for running warehouse loads for multiple tenants of a data warehouse, in accordance with an embodiment.

More specifically, FIG. 13 shows a multitenant ETL process where the resources of a single ETL server are shared amount multiple tenants, in accordance with an embodiment.

In accordance with an embodiment, such a multitenant supported ETL comprises three primary phases: extract 1301, transform 1302, and load 1303. In the extract phase, within a customer tenancy 1350 or 1360, depending upon which tenancy is currently performing ETL (or simultaneously in certain circumstances), each tenant may have a different source of data has a source, such as a business productivity application/database instance 1306 or 1366. The data can be moved to each tenant's respective staging area 1310 or 1370, where all the transformations are carried out. These transformations can involve the transformation from a source data schema (SDS) 1311 1371 to a data warehouse schema (DW) 1312 1372. Finally, the transformed data can be pushed/loaded/published to a respective tenant's autonomous data warehouse (ADW) 1321 or 1391. This transformed data that has been loaded into the tenant ADW can then be published to a place that the end user would consume it from (e.g., from within an analytics application).

In accordance with an embodiment, each tenant's data is kept separate during this entire process. Each tenant maintains control and ownership over the tenant staging area where data is transformed. As well, each tenant maintains ownership and control over their respective sources, as well as the targets (e.g. the autonomous data warehouses).

In accordance with an embodiment, while the source/staging/target databases are specific to the customers/tenants, the ETL server 1330, agents 1331, and ETL metadata 1332 supports multiple tenants as it can cater to the ETL requests of multiple customers/tenants. While a tenant's source system is unique to a tenant, and while the target warehouse is generally also provisioned to the tenant's specifications (and is also kept private for security reasons), the ETL server that is orchestrating the ETL, is shared across customers. This results in better optimization of resources. Such sharing of the ETL resources also allows for easier updates and maintenance of the ETL server/agents/repository as patching one instance of the ETL resources provides the patch to multiple tenants.

In accordance with an embodiment, connections, customizations, and the enablement of resource availability is continued to be provided by the above described systems and methods.

In accordance with an embodiment, the systems and methods can provide for connections/topology for multiple tenants to be supported by a single data integrator. A data integrator, which can comprise the ETL server/agents/repository can comprise logical schema and physical schema. When a tenant designs a model and mappings of an ETL, the design is against a logical schema. When such mappings are run, the ETL creates a physical schema which is the actually connection against which the mapping is run. A context is then created which is a mapping of all the logical schemas in the repository to the physical schemas Therefore, in accordance with an embodiment, within the data integrator repository 1332, logical schemas are first created. These schemas have occurrence in the repository for a given source/target schema. For each of the tenants, then, the following is performed. First, a physical schema is created for each of the logical schemas present. Second, a context is created that maps these physical schemas to the logical schemas. This is unique for each tenant instance.

In accordance with an embodiment, when a load plan runs, the load plan necessarily identifies the context against which the load plan is to be run. Since the context is unique and contains the mapping to the physical schemas corresponding to that customer, the load plan will get the data from the corresponding customer's source system and load the warehouse for that customer.

In accordance with an embodiment, the systems and methods can provide for customization by multiple tenants supported by a single data integrator. Customizations are unique to each customer, and as such, all customizations are stored in the customer database (not shared). When the mapping is run, the ETL resources can query that customer's database and form the query dynamically. That way the same metadata can be used to handle customization that in unique to each customer.

In accordance with an embodiment, the systems and methods can provide for resource availability by multiple tenants supported by a single data integrator. In embodiments, the ETL resources (e.g., server, agents, and repository) can use agents. A data integrator agent generally comprises an orchestrator. Such data integrators run the relevant mappings in the sequence specified in the load plan and are responsible for firing the appropriate queries to the source/target databases. One data integrator repository can have multiple agents. A particular run of a load plan can be targeted at a particular agent. So by having a cluster of data integrator agents, when a system submits multiple ETL runs for multiple tenants in parallel, the data integrator can service the requests appropriately by increasing the number of agents to a repository when the system needs to scale out. Agents also have a parameter specifying the number of threads that can be run in parallel. The agents are as such not dedicated to a customer/tenant. Instead depending on the concurrent load that the platform is sized for, the ETL server can have many agents running. When the ETL server runs a load plan, the request is sent to the agent that is free. Since the state of the load plan is stored in the data integrator repository, which is common for all the agents, this allows for monitoring if the state of the load plan using any other agent. Load plans can also be restarted using a different agent (Whatever is free when the load plan is restarted).

In accordance with an embodiment, while only 2 customer tenancies are shown in FIG. 13, one of skill in the art would readily understand that more customer tenancies can be supported in such a system, where each customer tenancy is still supported by the shared ETL server.

In accordance with an embodiment, when multiple ETL processes are running in parallel, the agents deployed to/allocated in conjunction with each separate ETL process are exclusionary from each other. That is, each set of ETL agents deployed/allocated to each ETL process cannot concurrently be deployed/allocated to a different ETL process that is currently running.

In accordance with an embodiment, having a cluster of data integrator agents that are accessible by any customer tenancy (e.g., customer 1 tenancy 1350 or customer 2 tenancy 1360), when a system submits multiple ETL runs for multiple tenants in parallel, the data integrator can service the requests appropriately by increasing the number of agents to a repository when the system needs to scale out. Each tenant can have a separate reference to, or be provisioned one (or more, if needed) data integrator agents, e.g., 1370 and 1371. These agents work on behalf of the respective tenant in accessing, e.g., ETL server resources as well as pulling information from the data integrator repository 1332 to, for example, pull specific parameters for each tenant's specific ETL process. Agents also have a parameter specifying the number of threads that can be run in parallel. Prior to being dedicated/assigned to a tenant, data integrator agents are not assigned. When the ETL server runs a load plan, the request is sent to the agent that is free, which then runs in the context of the assigned tenant.

Since the state of the load plan is stored in the data integrator repository, which is common for all the agents, this allows for monitoring if the state of the load plan using any other agent. Load plans can also be restarted using a different agent (e.g., whichever agent is free when the load plan is restarted).

Figure 14:
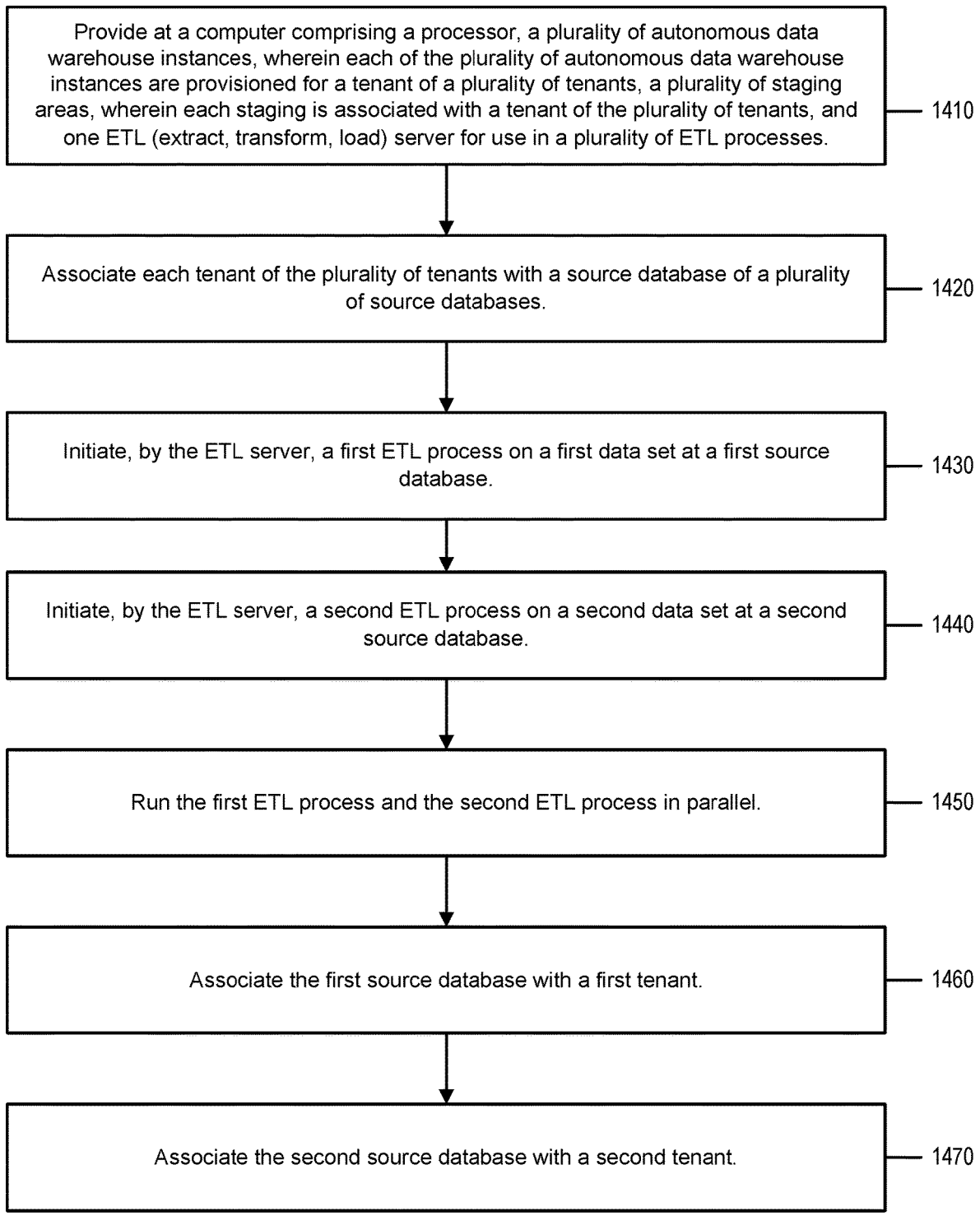
FIG. 14 is a flowchart of a method for running warehouse loads for multiple tenants of a data warehouse in an analytics application environment, in accordance with an embodiment.

FIG. 14 is a flowchart of a method for running warehouse loads for multiple tenants of a data warehouse in an analytics application environment, in accordance with an embodiment.

In accordance with an embodiment, at step 1410, the method can provide at a computer comprising a processor, a plurality of autonomous data warehouse instances, wherein each of the plurality of autonomous data warehouse instances are provisioned for a tenant of a plurality of tenants, a plurality of staging areas, wherein each staging is associated with a tenant of the plurality of tenants, and one ETL (extract, transform, load) server for use in a plurality of ETL processes.

In accordance with an embodiment, at step 1420, the method can associate each tenant of the plurality of tenants with a source database of a plurality of source databases.

In accordance with an embodiment, at step 1430, the method can initiate, by the ETL server, a first ETL process on a first data set at a first source database.

In accordance with an embodiment, at step 1440, the method can initiate, by the ETL server, a second ETL process on a second data set at a second source database.

In accordance with an embodiment, at step 1450, the method can run the first ETL process and the second ETL process in parallel.

In accordance with an embodiment, at step 1460, the method can associate the first source database with a first tenant.

In accordance with an embodiment, at step 1470, the method can associate the second source database with a second tenant.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of an analytic applications environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for running warehouse loads for multiple tenants of a data warehouse in an analytics application environment, comprising:
a computer comprising a processor;
a plurality of autonomous data warehouse instances, wherein each of the plurality of autonomous data warehouse instances are provisioned for a tenant of a plurality of tenants;
a plurality of staging areas, wherein each staging area is associated with a tenant of the plurality of tenants;
one ETL (extract, transform, load) server for use in a plurality of ETL processes;
wherein each tenant of the plurality of tenants are associated with a source database of a plurality of source databases;
wherein the ETL server initiates a first ETL process on a first data set at a first source database;
wherein the ETL server initiates a second ETL process on a second data set at a second source database;
wherein a plurality of data integrator agents are supported by a data integrator within a data integrator repository and accessible by each tenant to access ETL resources for use during the first and second ETL processes, and the plurality of data integrator agents are unassigned until accessed by the tenant;
wherein the first ETL process and the second ETL process run in parallel, and in response, the data integrator adjusts a number of agents to the data integrator repository that can be deployed as ETL agents to the first ETL process and the second ETL process;
wherein the first source database is associated with a first tenant; wherein the second source database is associated with a second tenant.

2. The system of claim 1,
wherein the first ETL process extracts the first data set from the first source database;
wherein the first ETL process transforms the first data set at a first staging area associated with the first tenant;
wherein the first ETL process loads the transformed first data set to a first instance of the autonomous data warehouse associated with the first tenant using in part an assigned data integrator agent, wherein the assigned data integrator agent and the tenant associated with the assigned data integrator agent designs a model and mappings of an ETL against a logical schema and the ETL creates a physical schema in response to running of the mappings, the physical schema being a connection against which the mapping is run and a context is created using the mapping, the context being a mapping of all the logical schemas to the physical schemas, and wherein the data integrator is a single data integrator supporting customization by a plurality of tenants including the first and second tenants.

3. The system of claim 1,
wherein the second ETL process extracts the second data set from the second source database;
wherein the second ETL process transforms the second data set at a second staging area associated with the second tenant;
wherein the second ETL process loads the transformed second data set to a second instance of the autonomous data warehouse associated with the second tenant.

4. The system of claim 3,
wherein an initial number of ETL agents are provisioned at the ETL server.

5. The system of claim 4,
wherein a first set of ETL agents are deployed in the context of the first ETL process in response to the ETL server running a load plan, and one or more requests associated with the load plan are sent to one or more ETL agents of the first set of ETL agents that are free, such that resource availability is provided by the plurality of tenants supported by the single data integrator.

6. The system of claim 5,
wherein a second set of ETL agents are deployed in the context of the second ETL process.

7. The system of claim 6,
wherein the first set of ETL agents are exclusionary from the second set of ETL agents, one or more load plans can be restarted using different ETL agents, a parameter of the agents of the first and second sets of ETL agents specifies a number of threads that can be run in parallel, and a state of the one or more load plans is stored in the data integrator repository and monitored by any of the agents of the first and second sets of ETL agents.

8. A method for running warehouse loads for multiple tenants of a data warehouse in an analytics application environment, comprising:
providing at a computer comprising a processor,
a plurality of autonomous data warehouse instances, wherein each of the plurality of autonomous data warehouse instances are provisioned for a tenant of a plurality of tenants,
a plurality of staging areas, wherein each staging is associated with a tenant of the plurality of tenants,
one ETL (extract, transform, load) server for use in a plurality of ETL processes;
associating each tenant of the plurality of tenants with a source database of a plurality of source databases;
initiating, by the ETL server, a first ETL process on a first data set at a first source database;
initiating, by the ETL server, a second ETL process on a second data set at a second source database;
accessing a plurality of data integrator agents by each tenant to access ETL resources for use during the first and second ETL processes, and the plurality of data integrator agents are supported by a data integrator within a data integrator repository and unassigned until accessed by the tenant;
running the first ETL process and the second ETL process in parallel;
adjusting, by the data integrator, a number of agents to the data integrator repository that can be deployed as ETL agents to the first ETL process and the second ETL process in response to running the first and second ETL processes;
associating the first source database with a first tenant; and
associating the second source database with a second tenant.

9. The method of claim 8,
wherein the first ETL process extracts the first data set from the first source database;
wherein the first ETL process transforms the first data set at a first staging area associated with the first tenant;
wherein the first ETL process loads the transformed first data set to a first instance of the autonomous data warehouse associated with the first tenant.

10. The method of claim 9,
wherein the second ETL process extracts the second data set from the second source database;
wherein the second ETL process transforms the second data set at a second staging area associated with the second tenant;
wherein the second ETL process loads the transformed second data set to a second instance of the autonomous data warehouse associated with the second tenant.

11. The method of claim 10,
wherein an initial number of ETL agents are provisioned at the ETL server.

12. The method of claim 11,
wherein a first set of ETL agents are deployed in the context of the first ETL process.

13. The method of claim 12,
wherein a second set of ETL agents are deployed in the context of the second ETL process.

14. The method of claim 13,
wherein the first set of ETL agents are exclusionary from the second set of ETL agents.

15. A non-transitory computer readable storage medium having instructions thereon for running warehouse loads for multiple tenants of a data warehouse in an analytics application environment, which when read and executed cause a computer to perform steps comprising:
providing at a computer comprising a processor,
a plurality of autonomous data warehouse instances, wherein each of the plurality of autonomous data warehouse instances are provisioned for a tenant of a plurality of tenants,
a plurality of staging areas, wherein each staging is associated with a tenant of the plurality of tenants,
one ETL (extract, transform, load) server for use in a plurality of ETL processes;
associating each tenant of the plurality of tenants with a source database of a plurality of source databases;
initiating, by the ETL server, a first ETL process on a first data set at a first source database;
initiating, by the ETL server, a second ETL process on a second data set at a second source database;
accessing a plurality of data integrator agents by each tenant to access ETL resources for use during the first and second ETL processes, and the plurality of data integrator agents are supported by a data integrator within a data integrator repository and unassigned until accessed by the tenant;
running the first ETL process and the second ETL process in parallel;
adjusting, by the data integrator, a number of agents to the data integrator repository that can be deployed as ETL agents to the first ETL process and the second ETL process in response to running the first and second ETL processes;
associating the first source database with a first tenant; and
associating the second source database with a second tenant.

16. The non-transitory computer readable storage medium of claim 15,
wherein the first ETL process extracts the first data set from the first source database;
wherein the first ETL process transforms the first data set at a first staging area associated with the first tenant;
wherein the first ETL process loads the transformed first data set to a first instance of the autonomous data warehouse associated with the first tenant.

17. The non-transitory computer readable storage medium of claim 16,
- wherein the second ETL process extracts the second data set from the second source database;
- wherein the second ETL process transforms the second data set at a second staging area associated with the second tenant;
- wherein the second ETL process loads the transformed second data set to a second instance of the autonomous data warehouse associated with the second tenant.

18. The non-transitory computer readable storage medium of claim 17,
- wherein an initial number of ETL agents are provisioned at the ETL server.

19. The non-transitory computer readable storage medium of claim 18,
- wherein a first set of ETL agents are deployed in the context of the first ETL process; and
- wherein a second set of ETL agents are deployed in the context of the second ETL process.

20. The non-transitory computer readable storage medium of claim 19,
- wherein the first set of ETL agents are exclusionary from the second set of ETL agents.

\* \* \* \* \*

UNITED STATES PATENT AND TRADEMARK OFFICE
CERTIFICATE OF CORRECTION

| | |
|---|---|
| PATENT NO. | : 11,615,108 B2 |
| APPLICATION NO. | : 16/852070 |
| DATED | : March 28, 2023 |
| INVENTOR(S) | : Vasireddy et al. |

It is certified that error appears in the above-identified patent and that said Letters Patent is hereby corrected as shown below:

On the Title Page

On page 2, Column 1, under item (56) Other Publications, Line 10, delete "eom" and insert -- com --, therefor.

In the Specification

In Column 5, Line 57, delete "organization," and insert -- organization. --, therefor.

In Column 11, Line 23, delete "analytics" and insert -- analytics. --, therefor.

In Column 19, Line 29, delete "schemas" and insert -- schemas. --, therefor.

In the Claims

In Column 22, Line 13, in Claim 1, delete "one" and insert -- an --, therefor.

In Column 22, Line 56, in Claim 3, delete "1," and insert -- 2, --, therefor.

In Column 23, Line 30, in Claim 8, after "staging" insert -- area --, therefor.

In Column 23, Line 32, in Claim 8, delete "one" and insert -- an --, therefor.

In Column 24, Line 32, in Claim 15, after "staging" insert -- area --, therefor.

In Column 24, Line 34, in Claim 15, delete "one" and insert -- an --, therefor.

Signed and Sealed this
Thirteenth Day of February, 2024

Katherine Kelly Vidal
*Director of the United States Patent and Trademark Office*